US006777364B2

United States Patent
Yoon et al.

(10) Patent No.: US 6,777,364 B2
(45) Date of Patent: Aug. 17, 2004

(54) METHOD OF THE PREPARATION OF MACROPOROUS FOAM COMPRISING ZEOLITE OR ZEOTYPE MATERIAL

(75) Inventors: Kyung-Byung Yoon, Seoul (KR); Yun-Jo Lee, Seoul (KR); Yong-Soo Park, Seoul (KR); Jin-Seok Lee, Seoul (KR)

(73) Assignee: Sogang University Corporation (KR)

( * ) Notice: Subject to any disclaimer, the term of this patent is extended or adjusted under 35 U.S.C. 154(b) by 118 days.

(21) Appl. No.: 10/148,780

(22) PCT Filed: Oct. 4, 2001

(86) PCT No.: PCT/KR01/01685

§ 371 (c)(1),
(2), (4) Date: Jun. 4, 2002

(87) PCT Pub. No.: WO02/28775

PCT Pub. Date: Apr. 11, 2002

(65) Prior Publication Data

US 2002/0183407 A1 Dec. 5, 2002

(30) Foreign Application Priority Data

Oct. 5, 2000 (KR) .................................. 2000-0058455

(51) Int. Cl.$^7$ ............................................... B01J 29/06
(52) U.S. Cl. ......................... 502/64; 502/60; 423/704; 423/705
(58) Field of Search .................. 502/60, 64; 423/704, 423/705

(56) References Cited

U.S. PATENT DOCUMENTS

| 4,133,691 | A | * | 1/1979 | Kindt et al. | 106/601 |
| 4,518,718 | A | * | 5/1985 | Frost | 521/122 |
| 4,863,712 | A | * | 9/1989 | Twigg et al. | 423/651 |
| 6,074,972 | A | * | 6/2000 | Bratton et al. | 502/4 |
| 6,540,939 | B1 | * | 4/2003 | Martin et al. | 252/299.01 |
| 2002/0018747 | A1 | * | 2/2002 | Pinnavaia et al. | 423/702 |

FOREIGN PATENT DOCUMENTS

| JP | 4-357178 | 12/1992 |
| JP | 8-198996 | 8/1996 |

OTHER PUBLICATIONS

Holland, et al., "Dual Templating of Macroporous Silicates with Zeolitic Microporous Frameworks", J. Am. Chem. Soc., 1999, 121. 4803–4309.

Seijger, et al., "In situ synthesis of binderless ZSM–5 zeolitic coatings on ceramic foam supports", Microporous and mesoporous materials 39 (2000) 195–204.

International Search Report—PCT/KR01/01658, ISA/KR, Jan. 30, 2002.

* cited by examiner

*Primary Examiner*—Tom Dunn
*Assistant Examiner*—Christina Ildebrando
(74) *Attorney, Agent, or Firm*—Harness, Dickey & Pierce, P.L.C.

(57) ABSTRACT

The present invention provides a macroporous foam comprising microporous zeolite or zeotype material and preparation thereof, which comprises dipping a polymeric template capable of releasing an amine which has a sponge or macroporous structure and can be selected from a group consisting of polyurethane, polyamides, aromatic or aliphatic polyimides, polyamideimides, epoxy resins having an amine skeleton, and polymeric materials capable of releasing an organic amine by hydrolysis, in an alkaline or acidic solution, gel or sol of a precursor of said zeolite or zeotype material, and reacting the resultant at a suitable temperature for a period such that all or almost all of the polymeric template can be replaced with zeolite or zeotype material. Said foam comprising zeolite or zeotype material has the outer shape and size and the inner sponge or macroporous structure which are the same or similar to those of the polymeric template used.

4 Claims, 4 Drawing Sheets

XRD pattern of ZSM-5 foam

XRD pattern of zeolite A foam

XRD pattern of zeolite Y foam

METHOD OF THE PREPARATION OF MACROPOROUS FOAM COMPRISING ZEOLITE OR ZEOTYPE MATERIAL

TECHNICAL FIELD

The present invention relates to macroporous foams comprising microporous zeolite or zeotype material, and to a method for the preparation thereof by using polymeric templates having a thread or film form or a sponge structure. More particularly, the present invention relates to macroporous foams which are prepared by using polymeric templates having a thread or film form or a sponge structure to crystallize microporous zeolite or zeotype material in a thread or film form or a sponge structure, and to a method for the preparation thereof.

BACKGROUND ART

The present invention belongs to the inorganic synthesis of synthesizing molecular sieves including zeolite or zeotype materials. "Zeolite" is a generic name of crystalline aluminosilicate, which constitutes the pore skeleton of zeolite molecules and bears an anionic charge for each aluminum atom. Cations for offsetting such anion charges are present within the very fine pore space which is regularly formed and has a size of not more than 2 nm and the remaining pore space is filled with water. The 3-dimensional pore structure of the zeolite molecules varies depending on the shape and size of the pore, and the pore diameter is usually corresponding to the size of molecules. Therefore, based on the shape and size of the pore, zeolite has the size selectivity for a molecule entering into the pore, and thus, zeolite is called as a molecular sieve.

In the context of the present invention, since zeolite and zeotype materials have micropores having a size of from a few nanometers to several tens nanometers, they are considered as being "microporous".

Microporous zeolite and zeotype materials are widely used in the field of households and various industries as a catalyst, adsorbent, ion exchanger, water-absorbing agent, etc. For examples, zeolite shows diverse chemical and physical properties depending on its chemical composition, structure, pre-treatment method, etc. Especially, zeolite itself has a resistance to high temperature and a modified zeolite in which protons are replaced with other cations represents a strong acidic properties to serve as a strong solid acid, the modified zeolite is widely used as a cracking catalyst of crude oil in the petrochemical industry. In addition, such acidic zeolite is widely used as acid catalyst in various chemical reactions as well as a ion exchanger, water-absorbing agent, adsorbent, gas-purifying agent, carrier for a purifying catalyst of exhausting gases of internal combustion engines, additives for detergent, soil improving agent, additives for animal feed, etc. Further, an extensive study is now being made on its application as a sensor carrier in which zeolite is shaped in the form of a thin membrane.

Meanwhile, there are many known zeotype molecular sieves wherein a part or all of silicon (Si) and/or aluminum (Al) atoms constituting the structural skeleton of zeolite molecule are replaced with other elements. For example, a porous silicalite-type molecular sieve in which aluminum atoms are completely eliminated, an alpo($AlPO_4$)-type molecular sieve in which silicon atoms are replaced with phosphorous atoms, and other molecular sieve or zeotype material wherein skeleton metal atoms are partially replaced with various metal atom such as Ti, Mn, Co, Fe, Zn, etc., have been developed and widely used. In recent, many studies are also being made on mesoporous materials (MCM-series silica) of which pore size is up to several tens nanometers.

Such molecular sieves such as zeolite or zeotype materials are prepared by crystallizing the precursor thereof and generally obtained in the form of fine powder with a diameter of less than about 10 micrometers.

When such zeolite or zeotype materials in the form of powder are filled in a container or reactor, it difficult for a liquid or gaseous fluid to flow through the powder since the spaces between the powder particles are too small. Therefore, a very high pressure is required in order to maintain a sufficient flow velocity in the container or reactor filled with molecular sieve powder, which causes problems that much energy is consumed and the cost for the production of the equipment and reactor is increased. There has been proposed various countermeasures in order to avoid such process problems owing to the pressure dropping phenomena.

A most commonly known method is the method of preparing a zeolite-clay composite, wherein zeolite powder is conglomerated by using clay as a binder to form a paste, which is then granulated to granules with a size of several millimeters, or is extruded in the form of noodle and then cut in a short length [Breck, D. W. *Zeolite Molecular Sieves* 725–755 (John Wiley & Sons, New York, 1974)]. However, the above-described method requires a mixing step of mixing zeolite with clay, a shaping step, and subsequent treating steps, which causes problems that the overall procedures are troublesome and overall cost for the production is increased. Further, since clay itself is considered as an impurity, the purity of zeolite in the composite is decreased, which causes a decrease of the zeolite using efficiency. Since pores may be blocked by clay particles, the zeolite using efficiency will be rapidly decreased.

In addition, as to granules or extrudates having a size of more than several micrometers, only the zeolite molecules present in the surface of a granule or extrudate generally participate in a reaction since reactants cannot easily access or penetrate into the inner portion of the granules or extrudates. Therefore, if zeolite is conglomerated by mixing with clay, the zeolite using efficiency will be greatly decreased. In addition, as to granules having a size of more than several micrometers, uniform reactivity at a uniform reaction temperature cannot be obtained since there is a temperature difference between the surface and the inner portion of a granule when a reaction is proceeded.

Another widely known technology is the method of coating zeolite film on a support having macropores of millimeters size, wherein the support is made of aluminum, alumina, stainless steel or the like in the form of honeybee or the like in order to facilitate the spread of molecules and various zeolite is coated thereon in the form of a thin film [Bein, T. *Chem. Mater.* 1996, 8, 1636–1653; Caro, J., Noack, M., Klsch, P. & Schfer, R. *Microporous and Mesoporous Materials* 2000, 38, 3–24; Clet, G., Jansen, J. C. & van Bekkum, H. *Chem. Mater.* 1999, 11, 1696–1702; Boudreau, L. C., Kuck, J. A. & Tsapatsis, M. *J. Membr. Sci.* 1999, 152, 41–59; van der Puil, N., Dautzenberg, F. M., van Bekkum, H. & Jansen, J. C. *Microporous and Mesoporous Materials* 1999, 27, 95–106; Kormarneni, S., Katsuki, H. & Furuta, S. *J. Mater. Chem.* 1998, 8, 2327–2329].

The zeolite-support composite particles thus prepared have advantages that the spread of reactants and products and the thermal transfer in all directions are easy, and the temperature distribution is uniform, etc., whereas the efficiency of zeolite used per unit weight are very small since the amount of zeolite used is much less than that of the support. In addition, since the thermal expansion coefficient of the zeolite is different from that of the support, repeated heating of said composite during the process may cause the deprival of the zeolite particles from the support. Further, since the amount of zeolite coated on the support is much less than that of the zeolite precipitated on the bottom of the reaction vessel during the coating process, there is severe waste of zeolite synthetic gel.

Sterte et al. describe a technology to form macropores in a zeolite mass wherein spherical ion exchange resin and active carbon are used as a support and said support is dipped in a synthetic gel to form zeolite thereon by a secondary crystal growing method and then removed by burning [Tosheva, L., Valtchev, V. & Sterte, *J. Microporous and Mesoporous Materials* 2000, 35–36, 621–629; Valtchev, V., Schoeman, B. J., Hedlund, J. Mintova, S. & Sterte, J. *Zeolites* 1996,17, 408–415]. However, since the ion exchange resin used as support is more expensive than zeolite and the zeolite mass has only a size of several hundreds micrometer, there is still caused a pressure depression phenomenon in a real application.

Anderson et al. report a direct converting method of porous diatomaceous earth diatom to zeolite by hydrothermal method [Anderson, M. W., Holmes, S. M., Hanif, N., & Cundy, C. S. Angew. *Chem. Int. Ed.* 2000, 39, 2707–2710]. In such case, there is an advantage that molecules can easily enter and leave via the macropores that the diatomaceous earth possesses by nature. However, since the particle size of the diatomaceous earth itself is basically small, for example of several tens $\mu$m, a second shaping step using a binding agent such as clay, etc. should also be needed in order to utilize them.

Stein et al. report a technology wherein polystyrene beads having a uniform size of about 100 micron are compactly charged, amorphous silica is charged and formed in the void space of said beads, and then said amorphous silica is converted to silicalite-1 which is one of zeotype materials, by a secondary method [Holland, B. T., Abrams, L. & Stein, A. *J. Am. Chem. Soc.* 1999, 121, 4308–4309]. This technology can afford a silicalite-1 in which macropores are distributed, but the overall process is complicated and has a limitation that it cannot be applied for the preparation of zeolite mass comprising both of aluminum atom and silicon atom. Further, a practical use of this technology is difficult in view of economics since the polystyrene beads used are expensive.

Under such circumstances described above, technical problems to be solved in the present invention are as follows:

1) In the foam mass formed with zeolite or zeotype materials, macropores through which molecules can freely spread should be spatially communicated with each other and uniformly distributed all over the foam mass.
(2) The size and shape of macropores formed in a foam should be adjusted in a free and unrestricted manner.
(3) The 3-dimensional outer size and outer shape of a foam comprising zeolite or zeotype materials should be adjusted in a free and unrestricted manner.
(4) The thickness and shape of the layer comprising microporous zeolite or zeotype materials which surrounds the macropores should be easily adjusted, and therefore, the mechanical strength of the foam should be controlled.
(5) Template should be inexpensive, diverse, and easily available.
(6) Preparation processes should be simple.
(7) Processing time should not be long.
(8) There should be reproducibility.
(9) Zeolite and zeotype materials of the foam thus prepared should have a high purity.
(10) Mass production should be allowed.

The present inventors have found that, if a solution, sol or gel of a precursor of zeolite or zeotype materials are charged in a polymeric template having a sponge structure and aged under alkali or acidic condition to crystallize the zeolite or zeotype materials, it is possible to obtain a foam comprising zeolite or zeotype materials and having a sponge structure which is nearly completely resembled to that of the template used, with solving most of or all of said technical problems to be solved as described above.

By using the method proposed in the present invention, it is possible to prepare a foam comprising zeolite or zeotype materials in which macropores (pores having a size of 100 nanometers) are organically linked with each other and have a size of several hundreds micrometers, and therefore, the pressure depressing phenomenon disappears since molecules can move through the macropores present in the foam.

In addition, since it is possible to freely shape template and thus form a zeolite foam having a desired outer shape, a separate shaping step in which clay is used to shape zeolite in a specific form is not needed and thus the cost for the production is remarkably decreased. Further, since there is no blocking problem owing to a binding agent, molecules can freely move inside the zeolite foam having various outer shapes and thus the zeolite using efficiency is substantially increased to nearly 100%.

In addition, since zeolite is formed in the form of a thin layer in the foam even without any separate support, the zeolite using efficiency is further improved. And since molecules can freely enter and leave the nanopores via the macropores, the thermal transfer into the inside of the foam is easy and a uniform reactivity owing to a uniform temperature distribution may be expected.

According to the present invention, therefore, both of the problems of the prior art caused by too small size of synthetic zeolite particles and the problems encountered in the macroporous granule or extrudate which is proposed to solve the problems of the prior art caused by too small size of synthetic zeolite particles can be solved and the object to maximize the zeolite using efficiency can be achieved.

DISCLOSURE OF INVENTION

The first object of the present invention is to provide a foam which is prepared by using a polymeric template capable of releasing an amine to crystallize zeolite or zeotype materials in the inner structure and outer shape the same with or similar to those of said template.

According to the concept and theory, it is possible to prepare an article comprising zeolite or zeotype material that is fitted to the inner and outer structure of a polymeric template capable of releasing an amine. Therefore, a variant wherein a polymeric template having a film form is used to prepare an article of film form does not deviate the scope of the present invention.

Therefore, according to one preferred embodiment of the present invention, a polymeric template capable of releasing an amine has a sponge or macroporous structure. In such case, thus prepared foams comprising zeolite or zeotype material has a sponge structure the same with or similar to that of said template.

According to another preferred embodiment of the present invention, a polymeric template capable of releasing an amine has a form of 3-dimension, film, thread or woven fabrics.

In the context of the present invention, the term "sponge structure" can be understood to illustrate the macroporosity of the polymeric templates. If a part or all of the macropores or bigger inner spaces than said macropores are spatially communicated with each other, it can be expressed as having a sponge structure.

The second object of the present invention is to provide a method for the preparation of a foam, wherein a polymeric template capable of releasing an amine is used to crystallize zeolite or zeotype materials in the inner structure and outer shape which are the same with or similar to those of said template.

As described above, a polymeric template capable of releasing an amine has a sponge or macroporous structure, and has a form of 3-dimensional mass, film, thread or woven fabric.

According to one preferred embodiment of the method of the preparation of the present invention, it comprises dipping a polymeric template capable of releasing an amine group in an alkaline or acidic condition, into a sol or gel containing a precursor of a zeolite or zeotype material, and aging the resultant at a suitable temperature for a period such that the polymeric template can be completely or nearly completely replaced with the zeolite or zeotype materials.

BRIEF DESCRIPTION OF THE DRAWINGS

The present invention can be illustrated by reference with the drawings attached.

Figure 3:
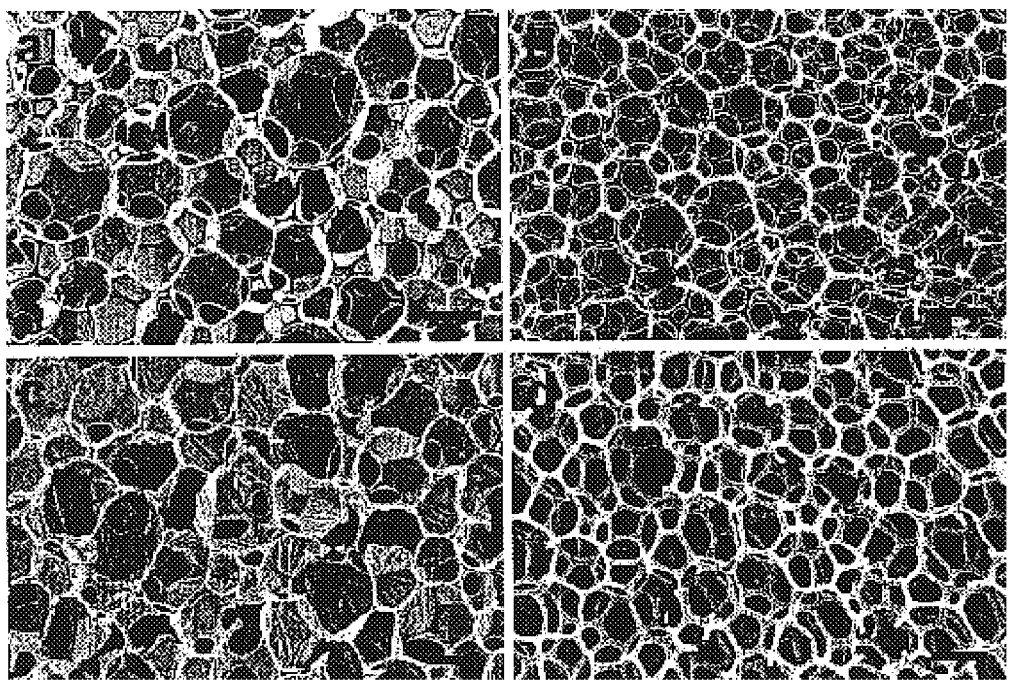
FIG. 3 shows SEM photos (a and c) of the inner structure of polyurethane sponge and SEM photos (b and d) of the inner structure of ZSM-5 foams prepared by using them as a template. The length of the bar at the right-bottom corner is 500 $\mu$m, which is the same in the drawings below.

As can be seen in FIG. 3, since macropores of 300~800 $\mu$m surrounded by a thin ZSM-5 film is communicated with each other via windows of 100~300 $\mu$m, molecules can freely enter and leave said macropores as well as fine nanopores in said ZSM-5 film surrounding the macropores and therefore, can contact with an acid site and/or active site in said nanopores to proceed a chemical reaction such as catalytic reaction, adsorption, ion exchange, etc. Therefore, zolite foam as described above in which macropores are spatially communicated with each other and uniformly distributed can be an ideal zeolite mass.

Figure 4:
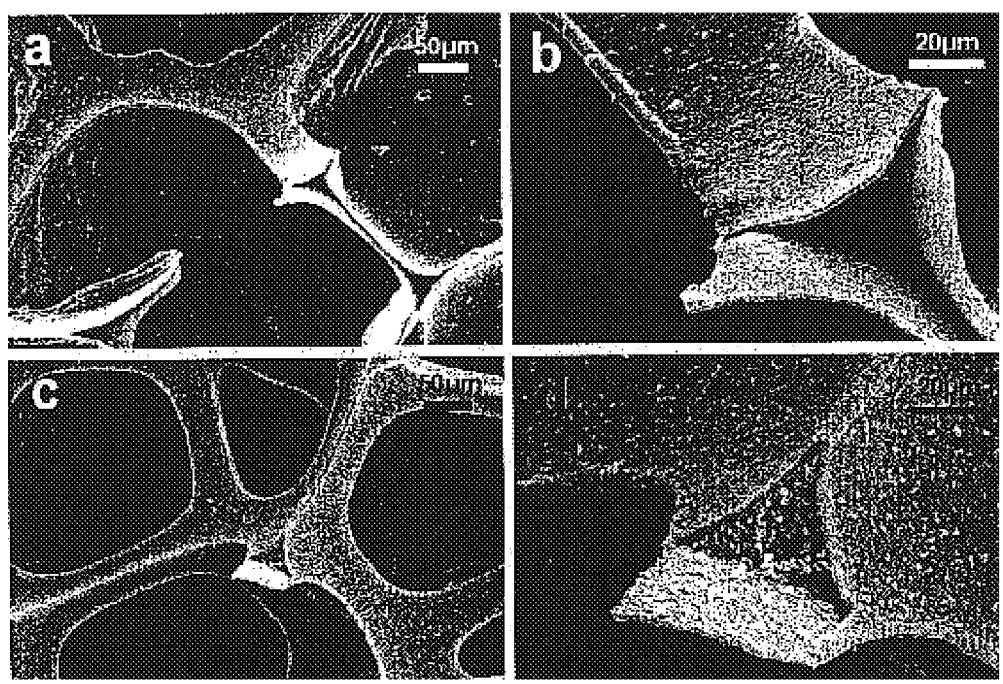
Figure 5:
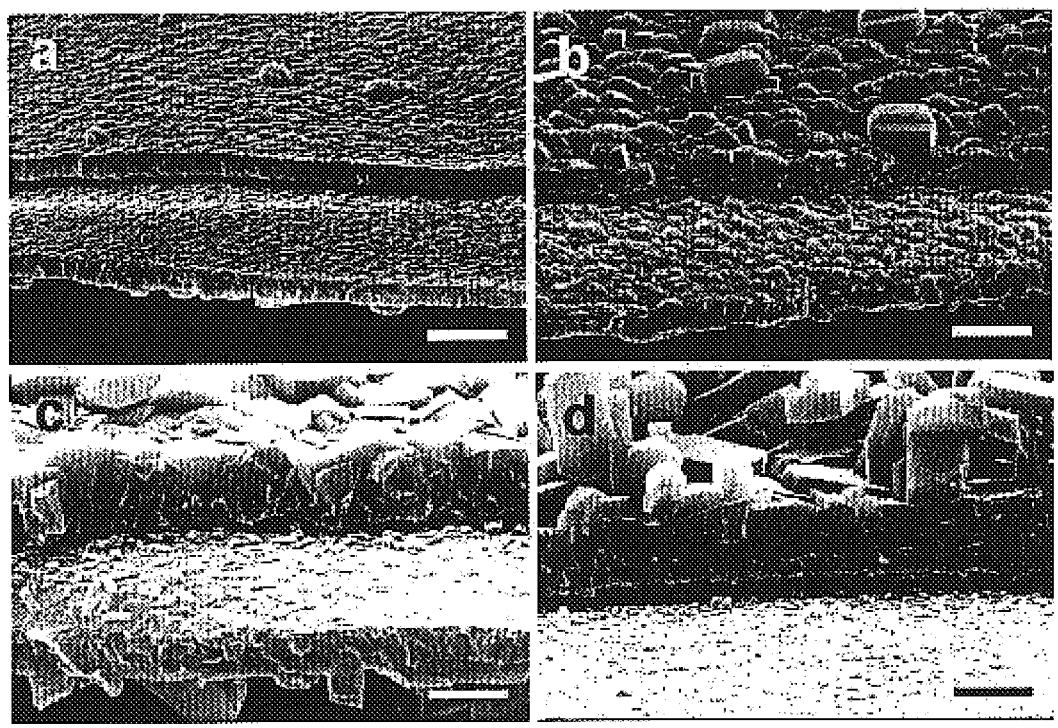

FIG. 4 shows SEM photos of ZSM-5 foams prepared by using as templates polyurethane sponges having different inner structures from each other. As such, the present invention has a feature that it can perfectly reproduce the outer shape as well as the inner structure of the polymeric material used as a template FIG. 5 shows SEM photos of the cross sections of zeolite films prepared in various thickness and shapes at a temperature of 100, 120, 140 and 180° C., respectively. It can be shown that it is possible to freely adjust the thickness and the surface shape according to the reaction temperature.

Figure 6:
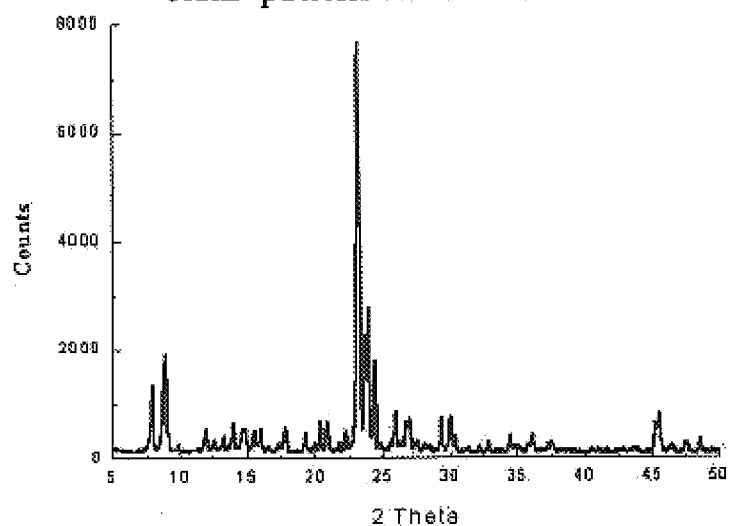
Figure 7:
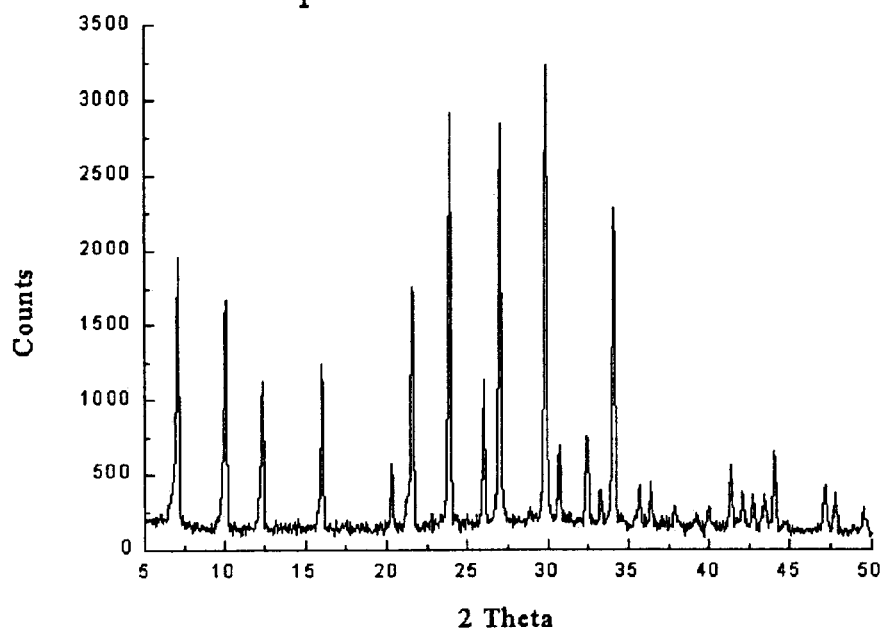
Figure 8:
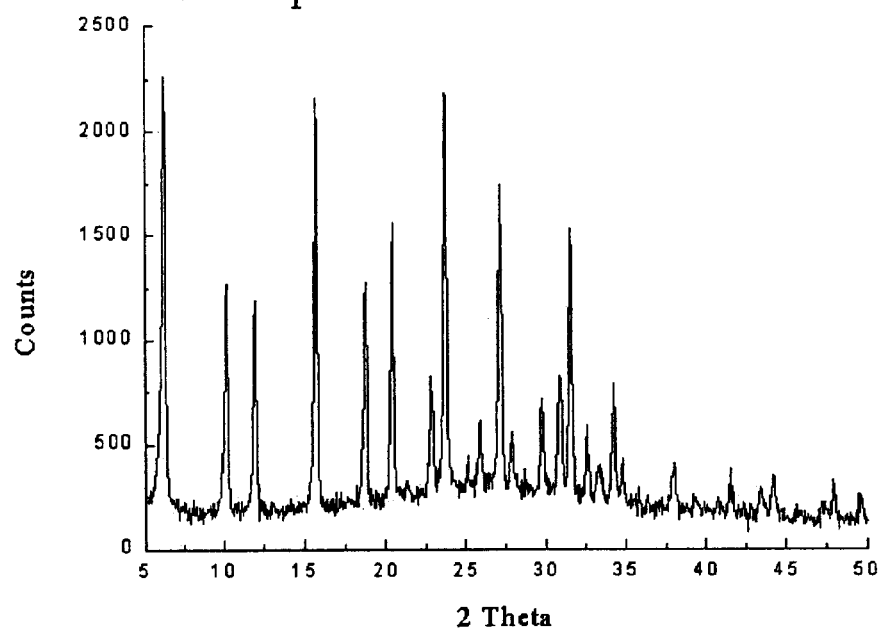

FIGS. 6, 7 and 8 shows X-ray diffraction (XRD) patterns of powders of foams comprising zeolite or zeotype materials which are prepared by using polyurethane sponges as a template according to the present invention, wherein said pattern are determined by using powder of a ZSM-5 foam (FIG. 6), a Zeolite-A foam (FIG. 7) and a Zeolite-Y foam (FIG. 8). It can be understood from said patterns that the crystal structure of the desired molecular sieve is very purely obtained even when a polymeric template of the present invention is used.

The present invention is illustrated below more specifically.

In the context of the present invention, the term "nanopore" means micropores having a pore size of from several nanometers to several ten nanometers which are present in zeolite or zeotype materials. The term "macropore" means large pores having a pore size of from several ten micrometers to several hundred micrometers, which are surrounded by thin layer or film of zeolite or zeotype materials. In the context of the present invention, the term "microporosity" means that there are such nanopores and the term "macroporosity" means that there are such macropores.

In the present invention, the term "template" means that it serves as a template when zeolite or zeotype material is generated. If the synthesis of zeolite or zeotype material is completed, the template material completely or almost completely will disappear and the spaces occupied by the template material and the adjacent area thereof will be occupied by zeolite or zeotype material.

In the present invention, by using a template having a film or a sponge structure, the outer shape of the template as well as the inner sponge structure and macropores thereof are perfectly reproduced. Therefore, when the template used has a film form, the resulted foam will has a film form, and when the template used has a macroporous or sponge structure, the resulted foam comprising zeolite or zeotype material will be formed so as to be macroporous or to have a sponge structure.

The polymeric materials which can be used as a polymeric template in the present invention are polymeric materials capable of releasing an organic amine or ammonium under an alkaline or acidic conditions, preferably has a sponge-like structure in which the inside macropores are spatially linked to each other. A polymeric template having a film form may be employed when a thin zeolite film or layer is needed. In such case, the template may not have a sponge structure.

Polymeric materials that can be employed as a template include natural or synthetic polymers or condensates, and for example, they can be selected from a group consisting of:

(1) polymers of polyurethane types, for example, prepared by using a polyol or polyhydric alcohol having two or more alcohol groups and an isocyanate, (2) polymers of polyamide types, such as nylons, peptides, silk, etc.

(3) aromatic or aliphatic polyimides, for examples, prepared by condensing a dianhydride and a diamine, etc., (4) polymers of polyamideimide types, (5) polymers of epoxy resin types, in which amine or its derivatives, such as urea, melamine, guanamine, etc. constitute the skeleton of the polymer, (6) other polymers which can be hydrolyzed by an acid or base to release organic amino groups.

The shape of template used in the present invention is not specifically restricted and generally has the following shapes:

(1) 3-dimensional mass or 2-dimensional film, (2) thread or woven fabrics.

When said type of the polymeric templates as listed above are employed, the principle that zeolite or zeotype material is generated in the same shape of the template is explained by using an example of a polyurethane template of a film shape as follows:

A polyurethane film itself without any support is dipped in a gel for synthesizing molecular sieve, or a polyurethane film is attached on a support such as glass, quartz, silicon wafer, porous alumina, porous stainless steel, etc. and then dipped in a gel for synthesizing molecular sieve to proceed a reaction.

The polyurethane is hydrolyzed under a basic condition to generate an alcohol ($R^1$—OH) and an organic amine ($R^2$—$NH_2$).

In general, since a precursor of zeolite or zeotype material can easily form the crystal of zeolite or zeotype material, said organic amine generated from polyurethane as described above can serve as a "frame" for the synthesis (crystallization) of zeolite or zeotype material That is, polyurethane template is decomposed under acidic or basic condition to generate organic amines, and thus resulted organic amines serve as a frame and zeolite or zeotype material is formed from the precursor thereof and then crystallized. At this time, the polyurethane template will be uniformly decomposed, the concentration of the organic amine frames is maintained constantly, and simultaneously, the zeolite or zeotype material will surround said organic amine frames uniformly. As a result, a zeolite film having a uniform thickness will be formed along the surface of the polyurethane film template.

The above process will be continuously lasted until all the polyurethane template material is exhausted, if the decomposition of polyurethane is lasted and the synthetic solution, gel or sol remains. Therefore, if the thickness of polyurethane film is increased and the synthetic solution, gel or sol is used in a sufficiently excess amount, a thick film of zeolite or zeotype material can be obtained.

In addition, if synthetic gel remains sufficiently and the reaction time is sufficiently prolonged even after all the polyurethane template material is exhausted, zeolite or zeotype material formed serves as a seed for the crystal growth and then zeolite crystals of various orientation will continuously grow. Thereby, it is possible to make a film thicker, and as a result, it is possible to adjust the thickness of a film. Further, by controlling the conditions of crystallization, it is possible to orient the surface crystals, for example, to cover the surface of the film comprising zeolite or zeotype material with sharp crystals.

When a polymeric template having a sponge structure is used, the above zeolite or zeotype material can be prepared so as to reproduce the above sponge structure and the reaction can be proceeded until zeolite or zeotype material completely replaces the polymeric template. In such case, it is possible to adjust the inner structure of the sponge structure, that is the thickness of the wall and the size of pores according to the conditions such as the type of materials used, reaction temperature, etc. In here, a person of ordinary skill in the art can determine the conditions to be necessary by a simple experiment and examination.

In general, zeolite or zeotype material is synthesized and crystallized under a basic condition, and a mesoporous silica such as MCM, SBA, MSU, KIT is synthesized and crystallized under an acidic or a basic condition. For reference, as to the types (e.g., MCM, SBA, MSU, KIT) and physical properties thereof of mesoporous silica, and the synthesis and crystallization method thereof, it is possible to refer to prior art, all of which is included in the present invention for reference.

With the same principle as described above, all polymer which can be hydrolyzed under a basic condition to release an organic amine can be used as a template for the preparation of foams comprising zeolite or zeotype material, and similarly, all polymer which can be hydrolyzed under an acid condition to release an organic amine can be used as a template for the preparation of foams comprising mesoporous silica.

Therefore, an organic amine in the term "polymer capable of releasing an organic amine" includes compounds having an ammonium group.

In the present invention, the organic amine generated by a hydrolysis can serve as a frame for the synthesis of zeolite or zeotype material, as well as a promoter to accelerate the synthesis/crystallization.

The precursors for the synthesis of zeolite or zeotype material, the methods and conditions therefor are well known in the art, for example, the precursors, the synthetic methods and conditions described in the above prior art can be mentioned. These are incorporated in the specification of the present invention for reference.

Thus prepared foams comprising of zeolite or zeotype material of the present invention can be employed in all the fields to which a conventional zeolite or zeotype material can be applied, but also they represent good effects as follows:

(1) Easy and Free Adjustment of the Shape and Size of Foams

Since a template is made of polymeric materials so as to have a desired size and shape and a zeolite foam thus prepared therefrom reproduces the shape and size of the template used, zeolite foams of the present invention can be obtained in a size and shape that are substantially desired by a user.

On comparing with prior technology using a binding agent such as clay, the present invention does not need any mixing step with a binding agent and any shaping step, and therefore, the production cost can be greatly lowered.

In addition, the easiness of the adjustment of the 3-dimensional shape and size of foams can make it possible to appropriately design a foam and then to easily fit it to a reaction vessel's shape. Therefore, there is no troublesome step such as steps of filling and removing zeolite particles in the vessel.

Figure 1:
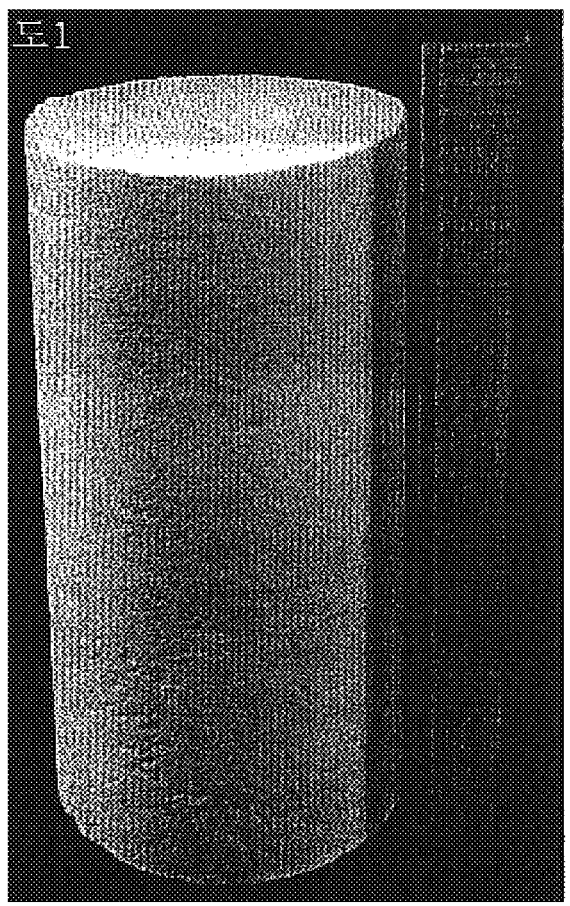
FIG. 1 shows a photo of a ZSM-5 foam according to the present invention, which is prepared by using a cylindrical polyurethane sponge (size of Φ 13 cm×27 cm) as a template. Said huge ZSM-5 foam having a diameter of 13 cm and a height of 27 cm shows that it is possible to prepare a foam having any huge size.
Figure 2:
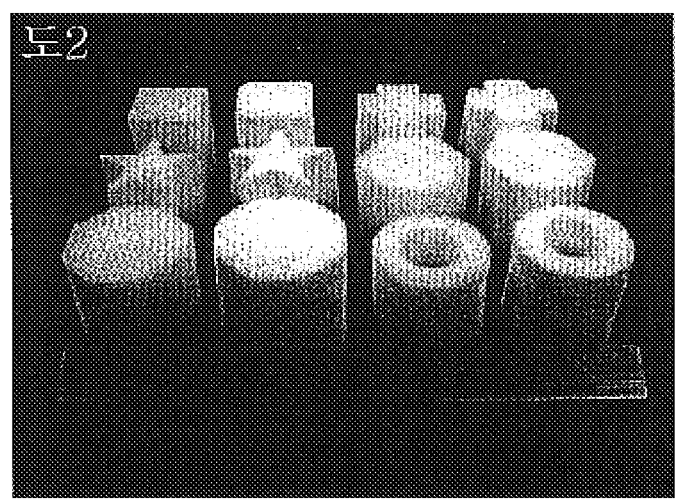
FIG. 2 shows a photo wherein polyurethane sponge templates having various shapes and corresponding ZSM-5 foams having the same shape are arranged in pairs. It can be shown that it is possible to prepare a template having various shapes when it is needed, as well as the foam thus prepared has a outer shape that is little changed from that of the original polyurethane sponge template.

The easiness and freedom of the adjustment of the size and shape of foams are illustrated in FIGS. 1 and 2 attached.

(2) Spatially Communicated Macropores of a Foam

Since macropores in a foam (macropore size of several hundreds $\mu$m to several thousands $\mu$m) are spatially communicated with each other and the distribution density and pore size thereof are uniform all over the foam, it is possible for molecules such as reactants, products, catalyst and/or solvent to freely move and/or spread via such macropores. As a result, there is no pressure-depressing phenomenon in any way.

The shape of spatially communicated macropores is well illustrated in FIGS. 3 and 4 attached.

(3) Purchase Easiness of Template Materials and their Low Price

Polymeric materials such as polyurethane used as templates are easily available and inexpensive. Further, it is another advantage that characteristics of pores can be adjustable.

(4) Possibility to Adjust the Macroporous Characteristics

Since template materials having very various kinds and characteristics (e.g., porosity and mean pore size) are easily available, it is possible to prepare a foam comprising zeolite or zeotype materials which has various usefulness and macroporous characteristics.

(5) No Problem on the Occlusion of Macropores

Since a zeolite foam prepared according to the present invention does not use any binding agent, there is no or little occlusion of macropores and thus it is possible for molecules to freely move to any place in the foam via the macropores. Therefore, the efficiency of using zeolite or zeotype materials can increase to nearly 100%.

(6) Thin Inner Wall of the Macropores

Since the zeolite or zeotype material is present in the form of thin film, it is possible for molecules to freely enter and leave the zeolite nanopores. As a result, the spread of molecules into the nanopores of zeolite and the macropores of a foam does not decrease the overall reaction rate.

(7) Possibility to Adjust the Thickness of Inner Wall of Macropores

The thin film of zeolite or zeotype material which constitutes the inner wall of the macropores in a foam can be adjusted by changing the amount of reactants, reaction temperature and time or the like, and thus, it is possible to adjust the thickness of inner wall of macropores. Therefore, the molecule diffusion velocity and mechanical strength of a foam can be adjusted.

An adjustment of the film thickness of a foam depending on the reaction temperature is illustrated in FIG. 5 attached.

(8) Economy of the Foam Production

The present invention is suitable to a mass production of foams in a low price, owing to a simple procedure of the foam production, a short process time, a high foam purity, a high reproducibility, a low price of template materials, and an easiness of availability of the template materials in large quantity.

(9) Novel Use

Foams comprising zeolite or zeotype material prepared according to the present invention can be employed in all the fields to which powder of zeolite or zeotype material is conventionally applied, such as, for example, catalyst, catalyst carrier, adsorbent, ion exchanger, absorbing agent, etc., as well as in the fields to which powder of zeolite or zeotype material cannot be applied till now, such as, for example, a purifying catalyst of exhausting gases of automobiles or a catalyst carrier.

As stated above, the present invention can solve the problems caused by the reason that the particles of conventional synthetic zeolite or zeotype material are too fine, and thus can contribute the maximization of zeolite using efficiency.

EXAMPLES

The present invention is further illustrated by referencing the Examples in below, which by no means restrict the present invention.

Example 1

Preparation of a Silicalite-1 Foam Using a Polyurethan Sponge as a Template

A 1M solution of tetrapropylammoniumhydroxide (TPAOH), which is used as a template for the preparation of zeolite or zeotype material such as zeotype material having a structure of MFI configuration, is added to 100 g of distilled water, to which 25 g of tetraethyl orthosilicate (TEOS) is added as silicone source and completely hydrolyzed under stirring.

In 30 g of the resulted colorless and transparent gel for the preparation of silicalite-1, 0.4 g of a polyurethane sponge having a suitable size is dipped to be soaked with the gel. The resulted sponge is then subjected to a synthetic reaction in an autoclave at 80~250° C. for 2 days. After the reaction, the resulted silicalite-1 foam is washed with distilled water and acetone. The weight of foam thus finally obtained is about 2 g.

Example 2

Preparation of a ZSM-5 Zeolite Foam Using a Polyurethane Sponge as a Template

The same procedure as described in Example 1 is repeated to prepare a foam product, except that 0.65 g of sodium aluminate ($NaAlO_2$) as aluminum source is further added to the gel for the preparation of silicalite-1 in order to synthesize ZSM-5 zeolite.

The ratio of silicon to aluminum in the synthetic gel thus prepared is about 25:1.

Example 3

Preparation of a TS-1 Foam Using a Polyurethane Sponge as a Template

The same procedure as described in Example 1 is repeated to prepare a foam product, except that 0.67 g of titanium tetraisopropoxide as titanium source and 10 ml of isopropanol are further added to the gel for the synthesis of silicalite-1 in order to synthesize TS-1 type molecular sieve.

The ratio of silicon to titanium in the synthetic gel thus prepared is about 50:1.

Example 4

Preparation of a Metallo-silicate-1 Foam Using a Polyurethane Sponge as a Template The same procedure as described in Example 1 is repeated to prepare a metallo-silicate-1 foam, except that a solution in which a salt of a transition metal (Fe, V, Co, Mn, Cr, Cu, etc.) is dissolved in distilled water is further added to the gel for the synthesis of silicalite-1. The transition metal salt used is $FeCl_2$, $VOCl_3$, $CoCl_2$, $MnCl_2$, $CrCl_3$ or $CuCl_2$, respectively.

The amount of the transition metal salts used is adjusted such that the ratio of silicon to transition metal in the synthetic gel thus prepared is about 100:1.

Example 5

Preparation of a MEL-type Zeolite (Silicalite-2, ZSM-11, TS-2, Metallo-silicalite-2) Foam Using a Polyurethane Sponge as a Template 43.8 g of a 20 wt % aqueous solution of tetrabutylammonium hydroxide (TBAOH), which is used as a template for the preparation of zeolite or zeotype material having a structure of MEL configuration, is added to 41 g of distilled water, to which 10 g of TEOS is added as silicone source and completely hydrolyzed under stirring.

To the resulted colorless and transparent synthetic gel, is added $NaAlO_2$, titanium tetraisopropoxide, $FeCl_2$, $VOCl_3$, CoCl$_2$, MnCl$_2$, CrCl$_3$ and CuCl$_2$ as the source of aluminum, titanium or a transition metal (Fe, V, Co, Mn, Cr, Cu, etc.), respectively, after mixing them with 10 g of distilled water in an amount to satisfy the following composition ratio:

x MO$_y$: 0.88 TBA$_2$O: z Na$_2$O: 1 SiO$_2$: 99 H$_2$O wherein, M represent an element such as Al, Ti, Fe, V, Co, Mn, Cr or Cu, x and z are independently a value between 0~0.1.

The subsequent procedure is similar to that of Example 1 and carried out at 50–250° C. depending on the constitutions and their ratio.

Example 6

Preparation of a Beta-zeolite Foam Using a Polyurethane Sponge as a Template 32.4 g of a 35 wt % solution of tetraethylammonium hydroxide (TEAOH), which is used as a template for the preparation of beta zeolite, is mixed with 1.3 g of distilled water, to which 0.65 g of NaAlO$_2$ as aluminum source and 10 g of TEOS as silicone source are added and completely hydrolyzed under stirring.

The composition of gel thus obtained is as follows:

2 Al$_2$O$_3$: 31.4 TEA$_2$O: 3 Na$_2$O: 100 SiO$_2$: 1020 H$_2$O.

The subsequent procedure of producing a beta zeolite foam is similar to that of Example 1 and carried out at 50~250° C.

Example 7

Preparation of a Zeolite-A Foam Using a Polyurethane Sponge as a Template

Zeolite-A containing tetramethylammonium hydroxide (TMAOH) ion is synthesized as follows:

Firstly, 27 g of TMAOH (25 wt %) is mixed with 100 g of water, to which 5.7 g of aluminum isopropoxide is added and the hydrolysis is carried out under stirring. To the resulting transparent gel, a solution of 0.57 g of NaCl in 10 g of distilled water was added. Finally, 9 g of silica sol (SiO$_2$ 40 wt %) as silicon source is added and well mixed.

The composition of the gel thus obtained is as follows:

0.35 Al$_2$O$_3$: 0.92 TMA$_2$O: 0.25 Na$_2$O: 1.5 SiO$_2$: 150 H$_2$O.

The subsequent procedure of producing a zeolite foam is similar to that of Example 1 and carried out at 50~250° C.

Example 8

Preparation of a Zeolite-Y Foam Using a Polyurethane Sponge as a Template

TMAOH is used as a template as in the preparation of zeolite-A of Example 7. 29.3 g of TMAOH (25 wt %) is mixed with 115 g of water, to which 3.79 g of aluminum isopropoxide is added and the hydrolysis is carried out under stirring. To the resulting transparent gel, a solution of 0.21 g of NaCl in 10 g of distilled water was added. Finally, 16.7 g of TEOS as silicon source is added and well stirred until being hydrolyzed.

The composition of the gel thus obtained is as follows:

0.35 Al$_2$O$_3$: 1.5 TMA$_2$O: 0.1 Na$_2$O: 3 SiO$_2$: 300 H$_2$O.

The subsequent procedure of producing a zeolite foam is similar to that of Example 1 and carried out at 50~250° C.

Example 9

Preparation of a Mesoporous Silica foam Using a Polyurethane Sponge as a Template A gel for the synthesis of mesoporous silica of MCM series is prepared as follows:

9.46 g of TMAOH is added to 104 g of distilled water, in which 19.66 g of cetyltrimethylammonium bromide (CTMAB) as a template is added and dissolved. To the resulting transparent solution, 21.2 g of TEOS is added and well stirred until being hydrolyzed.

The composition of the gel thus obtained is as follows:

0.13 TMA$_2$O: 0.54 CTMAB: 1 SiO$_2$: 60 H$_2$O.

The subsequent procedure of producing a mesoporous silica foam is similar to that of Example 1 and carried out at 50~250° C.

Example 10

Preparation of a ZSM-5 Film Using a Polyurethane Film as a Template

The preparation of ZSM-5 film is similar to that of ZSM-5 foam described in Example 2.

A polyurethane film alone without any support or a polyurethane film attached on a support such as a glass, quartz, silicon wafer, porous alumina, porous stainless steel or the like is dipped in a gel for the synthesis of ZSM-5.

The subsequent procedure similar to that of Example 1 is carried out to prepare a ZSM-5 film alone or on a support.

Example 10

Preparation of a Multi-layered ZSM-5 Film using a Polyurethane Film as a Template Polyurethane resin and polycarbonate resin are coated by turns in a multiple layer on a support such as a glass, which is then dipped in a gel for the synthesis of ZSM-5 as prepared in Example 1. The subsequent procedure similar to that of Example 1 is carried out to prepare a multi-layered ZSM-5 film.

The above procedure can be applied to other various zeolite and zeotype material.

Example 11

Preparation of a ZSM-5 Film or Fibrous Material using Nylon, an Aromatic or Aliphatic Polyimide, Polyamideimide or Urea Resin A film, membrane and fiber comprising various zeolite or zeotype material are prepared as in Example 1, except that polyurethane resin is replaced with nylon, aromatic or aliphatic polyimide resin, polyimide resin or urea resin having a form of film, sponge, fiber or textile.

Thus obtained products have the same or similar shape of the film, sponge, fiber or textile used as a template.

This example shows that it is possible to produce various shaped articles comprising zeolite or zeotype material depending on the shape of templates used.

Example 12

SEM (Scanning Electronic Microscope) Analysis

A platinum/palladium coating with a thickness of about 15 mm is placed on a zeolite foam prepared according to the above described Examples, from which SEM photos are obtained by using a SEM (Hitachi S-4300).

Example 13

XRD (X-Ray Diffraction) Analysis

X-ray powder diffraction patterns are obtained from the zeolite foams prepared according to the above described Examples by using CuKα X-ray to determine the degree of crystallization of the zeolite foams.

Industrial Applicability

According to the present invention, by using a polymeric template capable of releasing an amine which has a sponge or macroporous structure and which has a form of 3-dimension mass, film, thread or woven fabrics, it is possible to easily obtain a foam comprising zeolite or zeotype material which has the outer shape and size and the inner sponge or macroporous structure which are the same or similar to those of said polymeric template used.

Since the macroporous foam prepared according to the present invention possess macropores which are spatially communicated with each other and are huge enough for molecules to freely enter and leave, there is little or greatly reduced pressure depression phenomenon when they are applied to various fields.

What is claimed is:

1. A method of the preparation of a foam comprising a zeolite or zeotype material, which comprises dipping a polymeric template capable of releasing an amine in an alkaline or acidic condition, into a gel or sol containing a precursor of the zeolite or zeotype material, and aging the resultant at a suitable temperature for a period such that all or almost all of the polymeric template can be replaced with the zeolite or zeotype materials.

2. The method according to claim 1, wherein said polymeric template capable of releasing an amine has a sponge or macroporous structure.

3. The method according to claim 1, wherein said polymeric template capable of releasing an amine has a form of (i) a 3-dimensional mass, (ii) a film which may be supported by a support, (iii) a thread or (iv) a woven fabrics.

4. The method according to claim 1, wherein said polymeric template capable of releasing an amine is selected from the group consisting of:

(i) a polyurethane-typed polymer prepared by use of a polyol having two or more alcohol groups and an isocyanate;

(ii) a polyamide-typed polymer;

(iii) an aromatic or aliphatic polyimide prepared by condensing a dianhydride and a diamine;

(iv) a polyamideimide-typed polymer; and (v) an epoxy resin-typed polymer in which an amine or its derivative constitutes the skeleton of the polymer.

* * * * *